United States Patent [19]

Pazos

[11] Patent Number: 5,563,221

[45] Date of Patent: Oct. 8, 1996

[54] PROCESS FOR MAKING ETHYLENE OXIDE-CAPPED POLYOLS FROM DOUBLE METAL CYANIDE-CATALYZED POLYOLS

[75] Inventor: José F. Pazos, Havertown, Pa.

[73] Assignee: ARCO Chemical Technology, L.P., Greenville, Del.

[21] Appl. No.: 493,372

[22] Filed: Jun. 21, 1995

[51] Int. Cl.$^6$ .................................................. C08G 65/32
[52] U.S. Cl. ...................... 525/409; 528/419; 528/421; 568/618; 568/620; 568/623; 568/624
[58] Field of Search ................................. 568/618, 620, 568/623, 624; 528/419, 421; 525/409

[56] References Cited

U.S. PATENT DOCUMENTS

| | | | |
|---|---|---|---|
| 3,317,508 | 5/1967 | Winquist, Jr. et al. | 260/209 |
| 3,427,256 | 2/1969 | Milgrom | 252/431 |
| 3,427,335 | 2/1969 | Herold | 260/429 |
| 3,445,525 | 5/1969 | Bormann et al. | 260/615 |
| 3,715,402 | 2/1973 | Louvar et al. | 260/613 |
| 3,823,145 | 7/1974 | Louvar et al. | 260/268 |
| 3,829,505 | 8/1974 | Herold | 260/611 |
| 3,941,849 | 3/1976 | Herold | 260/607 |
| 4,355,188 | 10/1982 | Herold et al. | 568/620 |
| 4,472,560 | 9/1984 | Kuyper et al. | 526/120 |
| 4,477,589 | 10/1984 | Van der Hulst et al. | 502/169 |
| 4,495,081 | 1/1985 | Vanderhider et al. | 252/182 |
| 4,687,851 | 8/1987 | Laughner | 544/398 |
| 4,721,818 | 1/1988 | Harper et al. | 568/120 |
| 5,144,093 | 9/1992 | Reisch et al. | 568/621 |
| 5,158,922 | 10/1992 | Hinney et al. | 502/175 |
| 5,235,114 | 8/1993 | Reisch et al. | 568/621 |

FOREIGN PATENT DOCUMENTS

| | | |
|---|---|---|
| 525267 | 7/1991 | Japan . |
| 517569 | 7/1991 | Japan . |

OTHER PUBLICATIONS

J. L. Schuchardt et al., "Preparation of High Molecular Weight Polyols Using Double Metal Cyanide Catalysts", Oct. 1989, p. 360

*Primary Examiner*—Patricia A. Short
*Attorney, Agent, or Firm*—Jonathan L. Schuchardt

[57] ABSTRACT

A process for making high-primary, low-unsaturation polyols is disclosed. A polyol made by double metal cyanide (DMC) catalysis is blended with a polyol made by basic catalysis, and the polyol blend is reacted with ethylene oxide to produce an ethylene oxide-capped potyol. The process overcomes problems of the conventional recatalysis approach to making EO-capped polyols from DMC-catalyzed polyols.

18 Claims, No Drawings

PROCESS FOR MAKING ETHYLENE OXIDE-CAPPED POLYOLS FROM DOUBLE METAL CYANIDE-CATALYZED POLYOLS

FIELD OF THE INVENTION

The invention relates to a process for making polyether polyols that have a high content of primary hydroxyl groups. In particular, the invention is a process for making ethylene oxide-capped polyols from polyols prepared by double metal cyanide catalysis.

BACKGROUND OF THE INVENTION

Ethylene oxide-capped polyols have long been valuable in the polyurethane industry because of the favorable reactivity of their primary hydroxyl groups with polyisocyanates. EO-capped polyols are normally made in two steps. First, propylene oxide (or a mixture of propylene oxide and ethylene oxide) is polymerized in the presence of a basic catalyst (usually potassium hydroxide) to produce a polyol that contains mostly or exclusively secondary hydroxyl groups. Second, ethylene oxide is added to the catalyst-containing mixture to convert some or most of the secondary hydroxyl groups to primary hydroxyl groups. The process conveniently uses the same catalyst (usually KOH) for both the propoxylation and ethoxylation steps.

Double metal cyanide (DMC) catalysts such as zinc hexacyanocobaltate offer many advantages for making polyether polyols. Polyols with exceptionally low unsaturation levels compared with KOH polyols can be made. The advantages of low-unsaturation polyols for making polyurethanes with improved properties are well documented. DMC catalysts also have exceptional activity, so polyol production is efficient. The best DMC catalysts now known are active enough to be used at such low concentrations that back-end purification of the polyols is often unnecessary.

In spite of the many advantages of DMC catalysts for making polyether polyols, an important drawback remains: ethylene oxide-capped polyols cannot be made directly using a DMC catalyst. In other words, one cannot prepare an oxypropylene polyol by DMC catalysis, and then simply add EO to cap the polyol (as is done with KOH). When EO is added to an polyoxypropylene polyol made with a DMC catalyst, the resulting product is a heterogeneous mixture of: (1) mostly unreacted polyoxypropylene polyol; and (2) a minor proportion of highly ethoxylated polyoxypropylene polyol and/or polyethylene oxide.

The usual way to make an EO-capped polyol from a DMC-catalyzed polyol involves recatalysis. See, for example, U.S. Pat. Nos. 4,355,188 and 4,721,818. First, an oxypropylene polyol (or random EO-PO copolymer) is made by DMC catalysis. Second, a basic catalyst such as an alkali metal, alkali metal hydride, alkali metal alkoxide, alkali metal hydroxide, or the like, is added. The basic catalyst deactivates the DMC catalyst. Typically, the polyol must then be stripped to remove water or alcohol introduced (even in trace amounts) with the basic catalyst. Finally, ethylene oxide is added to cap the polyol with oxyethylene units.

The recatalysis approach has some important disadvantages. First, many basic catalysts (particularly the alkali metals and alkali metal hydrides) are highly reactive, moisture-sensitive, and difficult to handle safely. Second, a dedicated reactor is needed for base-catalyzed EO capping because DMC catalysts are poisoned by even trace amounts of residual base. Thus, a reactor used for base-catalyzed EO capping must be cleaned scrupulously before another DMC-catalyzed reaction can be performed in the same reactor. On a large scale, this is impractical, so a dedicated reactor just for EO-capping is needed. Third, stripping polyols to remove water or alcohol is time consuming, energy intensive, and often gives sporadic results. Incomplete stripping gives hazy polyols that contain polyethylene oxide (reaction product of traces of water or alcohol with ethylene oxide), and hazy polyols are commercially undesirable.

An improved process for making EO-capped polyols from DMC-catalyzed polyols is needed. Preferably, the process would overcome the need for recatalysis. It would avoid highly reactive, moisture-sensitive ethoxylation catalysts, and would eliminate the need to strip water or alcohols from the polyol intermediate prior to addition of ethylene oxide. A preferred process would not require a dedicated reactor just for EO-capping. Ideally, the process would be easy to practice, and would provide a way to make low unsaturation polyols with high primary hydroxyl group contents.

SUMMARY OF THE INVENTION

The invention is a process for making ethylene oxide-capped polyols from double metal cyanide-catalyzed polyols. The process comprises blending a first polyol that contains an active double metal cyanide (DMC) catalyst with a second polyol that contains a basic catalyst. The resulting polyol blend is then reacted with ethylene oxide to produce an ethylene oxide-capped polyol.

I surprisingly found that DMC-catalyzed polyols, which cannot be directly ethoxylated, are capped successfully by first blending them with base-containing polyols, and then adding ethylene oxide to the polyol blends. The process of the invention overcomes some of the key drawbacks of the recatalysis approach to EO-capping DMC polyols. First, the invention overcomes any need to use reactive metals or metal hydrides; the basic catalyst (usually potassium hydroxide) used to make the second polyol catalyzes the ethoxylation. Second, because the reactor used for ethoxylating the polyol blends can also be used to make the base-catalyzed polyol component of the blend, a dedicated reactor is not needed just for EO-capping. Third, and most important, the process of the invention eliminates the need to strip water or alcohols from polyol intermediates prior to ethoxylation.

The invention provides a simple, effective way to make polyols that have reduced unsaturation levels (as a result of their preparation in part by DMC catalysis), and high primary hydroxyl group contents.

DETAILED DESCRIPTION OF THE INVENTION

The invention is a process for making an ethylene oxide-capped polyol by ethoxylating a blend of polyols. The polyol blend comprises a first polyol that contains an active double metal cyanide catalyst, and a second polyol that contains a basic catalyst. The polyol blend is reacted with ethylene oxide to produce an ethylene oxide-capped polyol.

The first polyol is made using a double metal cyanide (DMC) catalyst. Generally, any known DMC catalyst can be used. Suitable DMC catalysts are well known in the art. Catalysts and methods for preparing them are described fully in U.S. Pat. Nos. 3,427,256, 3,427,335, 3,829,505, 4,477,589, and 5,158,922, the teachings of which are incorporated herein by reference. Zinc hexacyanocobaltate catalysts are preferred. Recently, highly active DMC catalysts have been developed, as described, for example, in U.S. Pat. No. 5,470,813, and these catalysts are advantageously used to make the first polyol.

The first polyol is prepared by methods commonly known in the art. A heterocyclic monomer (usually an epoxide) reacts with an active hydrogen-containing initiator (typically a low molecular weight polyol) in the presence of a DMC catalyst to produce the first polyol. Suitable heterocyclic monomers, active hydrogen-containing initiators, and methods for making polyether polyols using DMC catalysts appear in U.S. Pat. Nos. 3,829,505, 3,941,849, 4,355,188, and 4,472,560, the teachings of which are incorporated herein by reference.

The first polyol is any polyether polyol that can be made by DMC catalysis. Preferred first polyols are polyoxypropylene polyols and random copolymers of propylene oxide and ethylene oxide. The first polyol preferably has a nominal functionality from 2 to 8, more preferably from 2 to 3. The first polyol generally has a hydroxyl number within the range of about 5 to about 500 mg KOH/g, more preferably from about 10 to about 100 mg KOH/g. The first polyol generally has a number average molecular weight within the range of about 200 to about 25,000, more preferably from about 500 to about 10,000. The first polyol generally has a low level of unsaturation, typically less than about 0.04 meq/g, preferably less than about 0.02 meq/g, and more preferably less than about 0.01 meq/g.

The first polyol is blended with a second polyol. The second polyol is prepared using a basic catalyst by methods well known to those skilled in the art of making conventional polyether polyols. A heterocyclic monomer (usually an epoxide) reacts with an active hydrogen-containing initiator (typically a low molecular weight polyol) in the presence of a basic catalyst to produce the second polyol. Suitable heterocyclic monomers, active hydrogen-containing initiators, basic catalysts, and methods for making polyethers using basic catalysts appear in U.S. Pat. Nos. 4,495,081, 4,687,851, 3,317,508, and 3,445,525, the teachings of which are incorporated herein by reference. Preferably, the second polyether is prepared using an alkali metal hydroxide (such as potassium hydroxide) as the basic catalyst.

The second polyol is any polyether polyol that can be made by basic catalysis. Preferred second polyols are polyoxypropylene polyols, random copolymers of propylene oxide and ethylene oxide, and EO-capped polyols. The second polyol preferably has a nominal functionality from 2 to 8, more preferably from 2 to 3. The second polyol generally has a hydroxyl number within the range of about 20 to about 1800 mg KOH/g, more preferably from about 30 to about 500 mg KOH/g. The second polyol generally has a number average molecular weight within the range of about 76 to about 8000, more preferably from about 500 to about 6000.

The first and second polyols are blended together by any suitable means. Preferably, the polyols are miscible. Generally, the polyols need not have the same or similar functionalities, hydroxyl numbers, or molecular weights. For some applications, it may be advantageous to use a first and second polyol that have very different characteristics. On the other hand, it is often convenient to blend polyols having about the same hydroxyl number to simplify the process of formulating polyurethanes.

The relative amounts of first and second polyols in the blend can vary within wide limits. Generally, it is preferred to use from about 10 to about 90 wt. % of the first polyol and from about 10 to about 90 wt. % of the second polyol in the blend. More preferably, the blend contains from about 30 to about 70 wt. % of the first polyol and from about 30 to about 70 wt. % of the second polyol.

When the polyols are blended together, some of the basic catalyst in the second polyol deactivates the DMC catalyst in the first polyol. The rest of the basic catalyst is available for catalyzing ethoxylation of the polyol blend. The basic catalyst, typically KOH, is present in the polyol blend in an amount within the range of about 0.05 to about 2 wt. %, which is sufficient for the ethylene oxide capping step. A more preferred range is from about 0.1 to about 1.0 wt. %.

In the second step of the process of the invention, the polyol blend reacts with ethylene oxide to produce an ethylene oxide-capped polyol. The amount of ethylene oxide (EO) used to cap the polyol depends on many factors, including the desired oxyethylene content of the polyether, the desired primary hydroxyl group content, the polyol molecular weights and functionalities, and other factors. Generally, the amount of EO used will be within the range of about 5 to about 30 wt. % based on the amount of ethylene oxide-capped polyol.

The process of the invention is used to make polyether polyols having a high content of primary hydroxyl groups. The proportion of primary hydroxyl groups needed for a particular use varies. Typically, products having from about 50% to about 95% primary hydroxyl groups are needed, preferably from about 70% to about 90%. These products can be made with the process of the invention.

The ethoxylation step is generally performed by heating the blend of first and second polyols to the desired reaction temperature, and adding ethylene oxide incrementally to the mixture. The technique is essentially the same as is now practiced for capping polyols with ethylene oxide using a basic catalyst. A suitable method is described, for example, in U.S. Pat. No. 4,355, 188, the teachings of which are incorporated herein by reference. The reaction temperature is typically within the range of about 50° C. to about 220° C. After EO addition is complete, the reaction is generally held at the same or a higher temperature to complete the polymerization.

Following ethoxylation, the EO-capped product is typically purified to remove catalyst residues. Any suitable means of purifying the polyol can be used, including treatment with an ion-exchange resin, water washing, or treatment with an adsorbent such as magnesium silicate. Suitable methods for purifying the EO-capped polyols are described, for example, in U.S. Pat. Nos. 3,715,402, 3,823,145, 4,721, 818, and 4,355,188, the teachings of which are incorporated herein by reference.

The polyether polyols made by the process of the invention have a high content of primary hydroxyl groups. This feature makes them valuable for polyurethane applications that require a "reactive" polyol. At the same time, the polyols have significantly lower unsaturation levels than polyols made using only a basic catalyst. When very low unsaturations are required, the relative proportion of DMC-catalyzed polyol in the blend is simply increased. Low unsaturation polyols such as the ones made by the process of the invention offer many well-recognized advantages for polyurethanes, including improved tensile properties and lower compression sets.

High-primary, low-unsaturation polyols were available previously, but only by a recatalysis procedure that requires careful stripping prior to ethoxylation. Even with good stripping, the recatalysis approach often gives hazy polyols.

The process of the invention surprisingly gives polyols with high primary hydroxyl group content and low unsaturation. In addition, the process of the invention gives haze-free products without requiring a stripping step.

The polyols made by the process of the invention are particularly useful for making polyurethane foams, elastomers, sealants, coatings, and adhesives. The polyols are especially valuable for making molded polyurethane foams, which are made at relatively cool temperatures and require a high content of primary hydroxyl groups for adequate reactivity.

The following example merely illustrates the invention. Those skilled in the art will recognize many variations that are within the spirit of the invention and scope of the claims.

EXAMPLE 1

A one-liter Parr reactor is charged with a polyoxypropylene triol (247 g) having a hydroxyl number of 41.5 mg KOH/g and an unsaturation of 0.008 meq/g, and which contains 25 ppm of active zinc hexacyanocobaltate catalyst. The reactor is also charged with a crude glycerin-started polyoxypropylene triol (134 g) that is made by KOH catalysis, and has a hydroxyl number of 41.5 mg KOH/g, an unsaturation of 0.046 meq/g, and a KOH content of 0.71 wt. %.

The polyol mixture is heated to 117° C., and propylene oxide (20 g) is added. After 45 min., the temperature is increased to 125° C., and is the mixture is kept at 125° C. for 90 min. Nitrogen is bled into the reactor until the pressure in the reactor is about 20 psig. Ethylene oxide (100 g) is added to the reactor at a rate of 1 g/min, and the mixture is kept at 125° C. for an additional hour following the EO addition. The product (491 g) is refined by passing it through an activated styrene/divinylbenzene cation-exchange resin.

The refined polyol has a hydroxyl number of 33 mg KOH/g, an unsaturation of 0.017 meq/g, an oxyethylene content of 20.5 wt. %, and a primary hydroxyl group content of 80%. The product is free of haze, and remains clear for months.

The preceding example is meant only as an illustration. The following claims define the scope of the invention.

I claim:

1. A process for making an ethylene oxide-capped polyol, said process comprising:
    (a) blending a first polyether polyol that contains an active double metal cyanide catalyst with a second polyether polyol that contains a basic catalyst; and
    (b) reacting the resulting polyol blend with ethylene oxide to produce the ethylene oxide-capped polyol;
   wherein the polyol blend contains from about 0.05 to about 2 wt. % of the basic catalyst.

2. The process of claim 1 wherein the first polyol is selected from the group consisting of polyoxypropylene polyols and random copolymers of propylene oxide and ethylene oxide.

3. The process of claim 1 wherein the first polyol contains a zinc hexacyanocobaltate catalyst.

4. The process of claim 1 wherein the second polyol contains an alkali metal hydroxide catalyst.

5. The process of claim 1 wherein the polyol blend contains from about 10 to about 90 wt. % of the first polyol and from about 10 to about 90 wt. % of the second polyol.

6. The process of claim 1 wherein the polyol blend contains from about 30 to about 70 wt. % of the first polyol and from about 30 to about 70 wt. % of the second polyol.

7. The process of claim 1 wherein the amount of ethylene oxide used in step (b) is within the range of about 5 to about 30 wt. % based on the amount of ethylene oxide-capped polyol.

8. The process of claim 1 wherein the ethylene oxide-capped polyol has at least about 50% primary hydroxyl end groups.

9. The process of claim 1 wherein the ethylene oxide-capped polyol has at least about 70% primary hydroxyl end groups.

10. A process for making an ethylene oxide-capped polyol, said process comprising:
    (a) blending a first polyether polyol that contains an active zinc hexacyanocobaltate catalyst with a second polyether polyol that contains an alkali metal hydroxide catalyst; and
    (b) reacting the resulting polyol blend with ethylene oxide to produce the ethylene oxide-capped polyol;
   wherein the polyol blend contains from about 0.05 to about 2 wt. % of the alkali metal hydroxide catalyst.

11. The process of claim 10 wherein the first polyol is selected from the group consisting of polyoxypropylene polyols and random copolymers of propylene oxide and ethylene oxide.

12. The process of claim 10 wherein the second polyol contains a potassium hydroxide catalyst.

13. The process of claim 10 wherein the polyol blend contains from about 10 to about 90 wt. % of the first polyol and from about 10 to about 90 wt. % of the second polyol.

14. The process of claim 10 wherein the polyol blend contains from about 30 to about 70 wt. % of the first polyol and from about 30 to about 70 wt. % of the second polyol.

15. The process of claim 10 wherein the amount of ethylene oxide used in step (b) is within the range of about 5 to about 30 wt. % based on the amount of ethylene oxide-capped polyol.

16. The process of claim 10 wherein the ethylene oxide-capped polyol has at least about 50% primary hydroxyl end groups.

17. The process of claim 10 wherein the ethylene oxide-capped polyol has at least about 70% primary hydroxyl end groups.

18. A process for making an ethylene oxide-capped polyol, said process comprising:
    (a) blending a first polyether polyol that contains an active zinc hexacyanocobaltate catalyst with a second polyether polyol that contains an alkali metal hydroxide catalyst; and
    (b) reacting the resulting polyol blend with ethylene oxide to produce the ethylene oxide-capped polyol;
   wherein the polyol blend contains from about 0.05 to about 2 wt. % of the alkali metal hydroxide catalyst;
   wherein the first polyol is selected from the group consisting of polyoxypropylene polyols and random copolymers of propylene oxide and ethylene oxide;
   wherein the polyol blend contains from about 10 to about 90 wt. % of the first polyol and from about 10 to about 90 wt. % of the second polyol;
   wherein the amount of ethylene oxide used in step (b) is within the range of about 5 to about 30 wt. % based on the amount of ethylene oxide-capped polyol; and
   wherein the ethylene oxide-capped polyol has at least about 70% primary hydroxyl end groups.

* * * * *